Feb. 9, 1960 R. J. BUSH 2,924,472
PIPE JOINT SEAL
Filed June 27, 1957

INVENTOR.
Russell J. Bush
BY
His Attorney

United States Patent Office 2,924,472
Patented Feb. 9, 1960

2,924,472

PIPE JOINT SEAL

Russell J. Bush, Dayton, Ohio, assignor to General Motors Corporation, Detroit, Mich., a corporation of Delaware Application June 27, 1957, Serial No. 668,482

2 Claims. (Cl. 288—24)

This invention relates to fluid seals and more particularly to improvements in seals suitable for sealing bell-and-spigot type pipe joints and the like.

Related subject matter is disclosed in the U.S. applications S.N. 573,248 and 650,222, assigned to the assignee of the present invention.

In the installation of tile or piping for the conveyance of sewage, industrial waste, storm water and the like, it is common practice to use pipe sections made of clay or similar material which are provided with bell-and-spigot type joints. These tile installations generally involve relatively low pressures up to about 10 ft. of waterhead. Sealing these pipe joints by caulking with hemp or oakum then sealing the joints with lead or other materials is more than adequate for most purposes but is time consuming and expensive. In recent years, a wide variety of unitary elastomeric type seals have been proposed which are inserted between the bell and the spigot to effect a seal. However, as a practical matter, a satisfactory design of the latter type of seal is complicated by the fact that the tile of the type referred to is generally manufactured under conditions whereby the diameter of the spigot and the bell may vary considerably within a given pipe size. Thus for example, manufacturing specifications generally call for a tolerance of plus or minus ½ inch on the pipe diameter for a nominal 6 inch pipe diameter, and the commercial product actually varies within these tolerances. Moreover, since in the process of firing the tile in an oven, the tile sections are generally stacked one on another, many of the commercial pipe sections may have an elliptical rather than a cylindrical shape. It is highly desirable therefore, if not essential, to have available a single size seal element for a given nominal pipe size which may be suitably adjusted to provide a satisfactory seal and satisfy the requirements of the various municipal sanitation codes, regardless of the variations within a given pipe size.

It is among the objects of this invention to provide a seal element for use in sealing opposed substantially annular surfaces which may be readily installed and readily adjusted to efficiently seal annular surfaces of varying dimensions. A more specific object of the invention is to provide an axially elongated elastomeric seal for insertion within the annular space of a bell-and-spigot pipe joint which is readily adjustable to accommodate pipe joints of varying dimensions. These and other objects are accomplished by providing a unitary seal element having opposed sealing surfaces adapted to sealingly engage opposed surfaces to be sealed, and a wedge receiving groove extending between the sealing surfaces and adapted to receive a wedge which is operative on insertion therein to force the sealing surfaces of the seal element apart and into compressive sealing engagement with the annular surfaces to be sealed. The seal element is constructed so that the wedge may be inserted into the groove to a predetermined degree and retained therein in a predetermined position whereby the sealing surfaces are spread apart and forced into compressive engagement with the surfaces to be sealed to a predetermined degree and thereby accommodate joints of varying dimensions.

Further objects and advantages of the present invention will be apparent from the following description, reference being had to the accompanying drawings wherein a preferred embodiment of the present invention is clearly shown.

Figure 1:
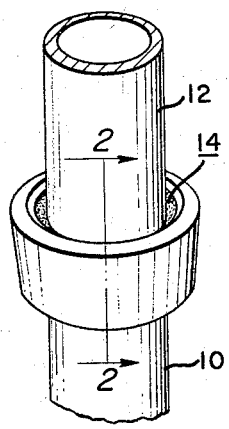
Fig. 1 is a bell-and-spigot joint sealed by the elastomeric seal element of the present invention.

A specific embodiment of the invention will now be described in relation to the drawings of which Fig. 1 illustrates a bell-mouthed pipe section 10 and a mating pipe section 12 assembled to form a pipe joint sealed by an annular elastomeric seal element 14.

Figure 2:
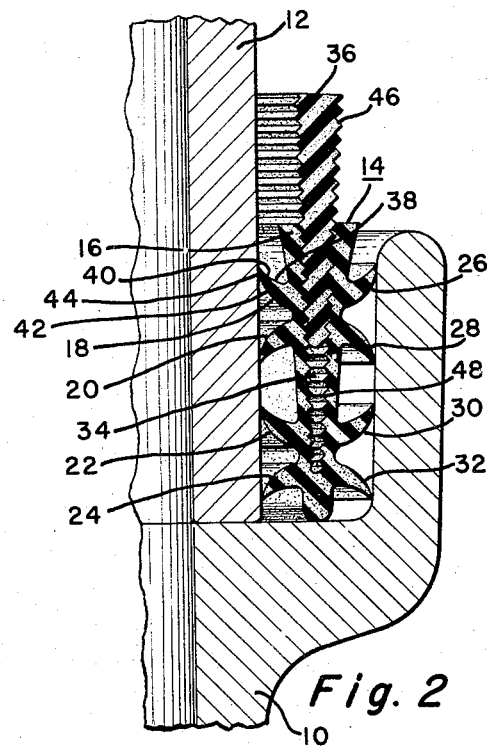
Fig. 2 is a cross-sectional view taken along line 2—2 of Fig. 1.

As shown in Fig. 2, the seal element 14 consists of an annular axially elongated main body portion 16 having a plurality of annular ribs or sealing lip supporting portions 18, 20, 22 and 24 integrally attached to the inner axial side of the main body portion 16 in axially spaced relation and a plurality of annular ribs or sealing lip portions 26, 28, 30 and 32 integrally attached to the outer axial side of the main body portion 16 in axially spaced relation. The main body portion 16 further has an annular groove or recess 34 extending axially therein between the inner and outer sealing lip supporting portions which recevies an annular wedge 36.

The sealing lip supporting members as for example 18, preferably have a cross-sectional shape in the form of a slanted cone, the upper portion 38 of which is bent axially to provide a concave surface 40, an opposed convex portion 42 and a sealing lip portion 44. In an installed position, as is shown in Fig. 2, the convex portion 42 engages the axial wall of the pipe section 12 and a sealing lip 44 constituting the outer end of the sealing lip supporting member 18 sealingly contacts the pipe wall. The sealing lip supporting portion 18 is sufficiently thick and sturdy so that together with the other sealing lip supporting portions, it is capable of sealingly supporting the spigot within the bell. Some of the sealing lip supporting members, as for example 18, 26, 22 and 30, are bent axially in a direction outwardly of the joint and other sealing lip supporting portions, as for example 20, 28, 24, and 32, are bent axially in an opposite direction with the result that outside pipe pressure acting on concave surfaces of the sealing lip supporting portions, as for example 18, tends to force the sealing lip 44 into tighter engagement with the pipe wall and internal pipe pressure acting on the concave surfaces, of for example the seal lip supporting member 24, tends to force the sealing lip thereof into tighter engagement with the pipe wall.

As is evident from Fig. 2, the insertion of the wedge 36 has the effect of radially compressibly moving the sealing lip supporting portions 18, 20, 22 and 24 against the axial wall of pipe 12 and the sealing lip supporting portions 26, 28, 30 and 32 against the bell wall of the pipe 10. Further, a progressive insertion of the wedge 36 has the effect of progressively moving the sealing lip supporting portions against the pipe walls so that an optimum compression may be obtained between the sealing lip supporting portions and the walls against which they seal by the insertion of the wedge 36 into the groove 34 to a desired degree. In order that the wedge be retained within the groove in any desired position, the surfaces of the wedge are provided with a plurality of annular teeth 46 and the walls of the wedge receiving groove are provided with cooperating annular teeth or projections 48. The wedge 36 is preferably formed of elastomeric material which is substantially harder than the elastomeric material of the seal body portion 16 so that it may more readily be inserted within the groove and more efficiently back up the sealing surfaces of the seal element. Thus for example, a suitable seal element may have a seal body portion 16 having a Durometer hardness of 70 plus or minus 5 and wedge 36 having a Durometer hardness of about 10 points more, as determined by Durometer Type A, manufactured by the Shore Manufacturing Company. Further, the wedge may suitably be made of other materials of sufficient hardness to permit its insertion in the groove and to enable it to force the sealing surfaces of the seal element apart. Although the wedge is shown in annular form, it is readily apparent that a wedge may also consist of a strip or a plurality of segments.

An important feature of the invention resides in its ease of assembly within a pipe joint since before insertion of the wedge member, the seal member is more or less in a collapsed form having a radial thickness which readily fits within the annular space between the mating pipe sections. A further advantage of the invention lies in the fact that the radial volume of the seal member may be increased in accordance with the degree to which the wedge is inserted in the receiving groove of the seal element. The seal element may suitably be used with joints having substantially parallel walls as is illustrated in Fig. 2. However, the seal element is particularly well adapted for sealing joints employing a conical bell inner surface since the wedge would have a greater capacity to spread the sealing surfaces of the seal element substantially uniformly along the axial length thereof.

By the term elastomeric as used herein is meant resilient, rubber-like materials such as natural rubber, butadiene-styrene copolymers, butadiene-acrylonitrile copolymers, polychloroprene, polysulphide rubbers, and mixtures of these and similar rubber-like materials.

Although the invention has been described in connection with Fig. 2 utilizing a specifically preferred sealing lip arrangement, the invention may be advantageously utilized in connection with other sealing lip arrangements. Thus for example, the sealing lip support members may all be bent axially outwardly of the joint as for example the support member 18 or they may all be bent axially inwardly of the joint as for example the support member 24.

Figure 3:
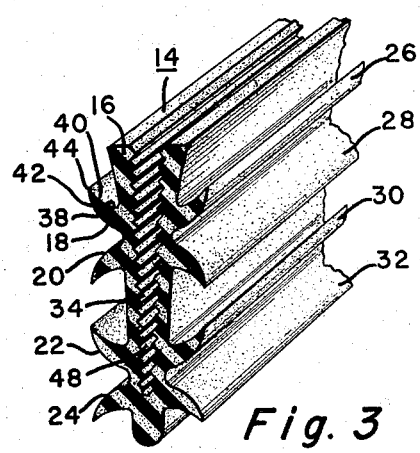
Fig. 3 is a fragmentary view in perspective of a seal element.
Figure 4:
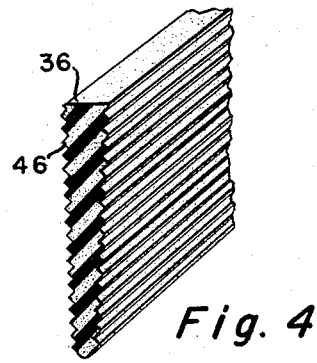
Fig. 4 is a fragmentary view of a wedge.

The seal lip element 16 and wedge 36 may conveniently be made by extruding elastomeric strips as shown in Figs. 3 and 4 and subsequently inserting the strips in an annular mold fixture wherein the free ends of the strip are joined by molding a joining section therebetween and thereafter vulcanizing to produce an annular seal member. Alternately the members may be molded directly in annular form or the strips shown in Figs. 3 and 4 may be cut to a proper size and the free ends thereof may be cemented together. In assembling the seal with a pipe joint, the walls of the spigot and bell against which the seal element is disposed, is preferably coated with a suitable adhesive which serves as a lubricant during the assembly of the joint and on curing serves to provide a highly efficient seal.

While the embodiments of the present invention constitute a preferred form, it is to be understood that other forms might be adopted.

What is claimed is as follows:

1. A two-way static yet resilient sealing means adapted to be used between mating end sections of tile-type pipes each having diameters that vary considerably within a given pipe size in accordance with manufacturing tolerances and that may even be out of round, comprising, an annular elastomeric tapered body member having an annular recess and provided with a plurality of projections extending radially inwardly relative to the recess extending axially relative to said body member from one end thereof, said body member forming radially inner and outer sides extending axially of said body member, a plurality of spaced clusters of annular inner and outer sealing lip portions attached to said body member along the sides, each of the clusters including at least one pair of radially inwardly and at least one pair of radially outwardly extending sealing lip supporting portions bent axially in opposite directions relative to each other along the sides and a separate annular wedge having a plurality of radially outwardly extending projections complementary to said projections extending radially inwardly relative to the recess into which said wedge is insertable to a predetermined degree whereby said sealing lip supporting portions are forced apart axially to a predetermined degree in a resilient condition free of complete flattening and permitting relative pipe end movement yet tending to force at least one of said pairs of sealing lips and supporting portions thereof into tighter engagement with at least one pipe end section thereby sealing against both outside and internal pipe pressure.

2. The sealing means of claim 1 wherein said radially inner and outer sides of said body member are joined only at one end and are separated by the annular recess extending to that end, said wedge being adapted to be inserted axially of the recess beyond pairs of sealing lips extending both radially inwardly and outwardly while said projections of said wedge and said inner and outer sides of said body member interlock as complementary serrations.

References Cited in the file of this patent
UNITED STATES PATENTS

| | | |
|---|---|---|
| 522,750 | Brown | July 10, 1894 |
| 808,922 | Herrick | Jan. 2, 1906 |
| 963,645 | Pendleton | July 5, 1910 |
| 1,016,124 | Bille | Jan. 30, 1912 |
| 2,032,492 | Nathan | Mar. 3, 1936 |
| 2,165,052 | Hering | July 4, 1939 |
| 2,182,995 | Pepper | Dec. 12, 1939 |
| 2,384,360 | Allen | Sept. 4, 1945 |
| 2,808,275 | Sherman | Oct. 1, 1957 |